United States Patent Office 3,120,497
Patented Feb. 4, 1964

---

3,120,497
PREPARATION OF XYLYLENE GLYCOL POLYMERS
Janis A. Bungs, Painesville, Ohio, assignor to Diamond Alkali Company, Cleveland, Ohio, a corporation of Delaware
No Drawing. Filed Sept. 21, 1959, Ser. No. 841,051
18 Claims. (Cl. 260—2)

This invention relates to novel compositions and processes wherein xylene compounds are converted into new and useful materials comprising polycondensation products thereof.

This is a continuation-in-part of my copending application Ser. No. 638,454, field February 6, 1957, now U.S. Patent No. 2,967,854.

More particularly, the present invention is directed to compositions and processes involving reaction products of side chain-halogenated xylenes, particularly the hydrolysis products, and further reaction products thereof, e.g., polyethers, polyesters and products obtained by reaction of such substances with other reacting materials, e.g., isocyanates.

The present invention is concerned with the utilization of xylene halides having a halogen atom in the side chain, preferably p-xylene halides, i.e., 1',4'-dichloro-p-xylene, as are readily obtained by halogenation of xylene. The present invention contemplates further reaction of such p-xylene halides via hydrolysis to form p-xylylene diol for polyesterification, polyetherification and preparation of polyurethanes.

Thus, the present invention broadly contemplates compositions of matter comprising substances obtained by the etherification of xylylene diol in the presence of a suitable catalyst. More specifically, the present invention preferably is concerned with linear high molecular weight polyethers which exhibit fibre-forming characteristics. Such polyethers have molecular weights of at least 5000 to 7000 and greater.

Low molecular weight polyethers, i.e., molecular weights in the range of 1000 to 1500, have been prepared previously. However, these were wax-like products and did not exhibit any properties of a plastic.

Further, the present invention is concerned with a method of preparation of a high molecular weight linear polyether. This method is based upon the use of specific catalysts and reaction conditions.

Polyethers, as contemplated by this invention, may be prepared by the condensation reaction whereby xylylene diol is heated in the presence of a suitable catalyst and water is evolved. The polyether thus formed is linear in nature and shows an absence of cross-linking. The catalyst may or may not become part of the polymer at the end of the condensation.

It is a widely accepted hypothesis that etherification (which is the basic reaction in formation of polyethers according to this invention) is a hydrogen-ion catalyzed process in which the anion of the acid, or acidic substance used as a catalyst, does not play any role. This hypothesis could be interpreted as indicating that for the polyetherification of p-xylylene diol, any acid or acidic substance could be used and the process would result in formation of a high molecular weight linear polyether as may be expected from the difunctionality of p-xylylene diol. However, experiments indicate that this assumption is not correct and that only certain specific acids may be used successfully for preparing a high molecular weight linear polyether.

Without the use of a suitable catalyst, the polyetherification, which proceeds according to Equation I, must be interrupted at a very early stage to avoid formation of a gel, i.e., formation of a cross-linked product. As shown by the work of Rhoad and Flory, the reason for formation of cross-linked polymers could be the reaction of the ortho-hydrogen atoms with the hydroxy methyl group as shown by Equation II.

Equation I

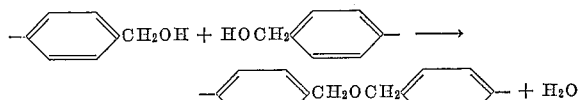

Equation II

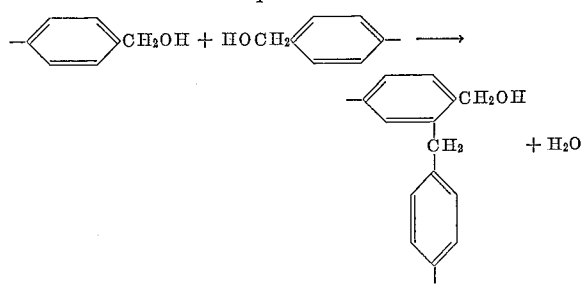

It has been found that different acids promote both processes differently, especially at the end of the condensation. For example, using sulfamic acid as the catalyst, cross-link formation (gelation) becomes the major reaction as soon as the degree of polymerization reaches 8 to 10, i.e., the polymer reaches a length of 8 to 10 molecules, at a temperature of 170° to 175° C. On the other hand, when phenylphosphonic acid is employed, it is possible to continue the condensation without gelation at a temperature of 200° to 215° C. for a period long enough to obtain a fibre-forming soluble polyether.

It was also found that, in preparing high molecular weight polyethers of p-xylylene diol, the difunctional acids are more suitable than the monofunctional acids. It appears that the anion of the acid, especially during the last stages of condensation, becomes part of the polyether (by formation of an ester linkage). Thus, a monobasic acid would act as a chain stopper while a dibasic acid acts as a chain coupler or extender. The preferred catalysts, according to this invention, are strong dibasic acids selected from the group consisting of alkyl phosphonic acids, aryl phosphonic acids and perfluorinated dicarboxylic acids. Specific examples of preferred catalysts are phenylphosphonic acid, chloromethyl phosphonic acid and perfluoroadipic acid.

It has also been found that neither the most active acids, such as hydriodic, sulfamic or p-toluene sulfonic acids, nor those having low activity, are suitable for preparing a high molecular weight linear polyether. Rather, those acids exhibiting moderate activity are preferred in the process of this invention.

It is a well known fact that the reaction

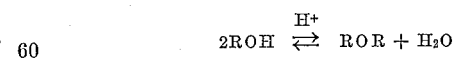

may be directed in either direction (etherification or hydrolysis), depending upon the water present in the alcohol-ether mixture. Therefore, rapid removal of the water, as it is formed, is essential in order to keep the etherification reaction progressing. In the polyetherification of p-xylylene diol, the viscosity of the reaction mixture steadily increases. Therefore, removal of water vapors from the melt becomes slower, especially at the end of the condensation. To avoid the deleterious effects of water vapor and to facilitate its removal, it is essential to lower the viscosity of the melt by increasing its temperature. For this reason, a catalyst which is active at higher temperatures seems to work better than a catalyst which promotes the reaction at a temperature just above the melting point of the p-xylylene diol. It is also essential to facilitate the evolution of water vapor from the melt by efficient stirring and by bubbling nitrogen through the melt. This should be accompanied by the use of efficient vacuum (0.5–1.0 mm. Hg) especially at the end of the condensation.

The method of this invention may be represented generally by the following equation:

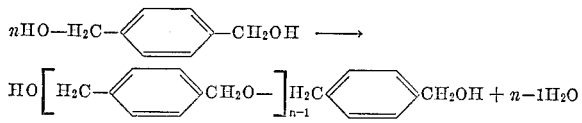

Depending on the catalyst used, the temperature at which the condensation of the xylylene diol is accomplished appears to be rather critical. The optimum temperature using phenylphosphonic acid as the catalyst was found to be between about 195° and 230° C. The preferred temperature is also related to the time of heating. Using 1 mole percent of phenylphosphonic acid as a catalyst, a temperature of about 225° to 230° C. for about 8 hours, or a temperature of about 195° to 215° C. for a period of about 10 to 13 hours, produced a polyether from which fibres could be drawn. When chloromethyl phosphonic acid was used as the catalyst, it was found that 0.5 to 1.0 mole percent of the catalyst at a temperature in the range of about 170° to 215° C. for about 2.5 to 3 hours also produced polyethers from which fibres could be drawn.

Although an increased temperature seems to be advantageous in promoting the etherification reaction and removal of water vapors, it was found that the temperature at the end of the condensation should not exceed about 210° to 230° C. If the condensation is carried out at temperatures in excess of this (depending upon the catalyst), deleterious side reactions become noticeable, and instead of etherification, degradation of the polyether can be observed. Formaldehyde has been identified as one of the degradation products. It is quite important to follow very carefully the course of condensation during the last stage and discontinue the reaction before the side reactions leading to cross-linked formation transform the viscous melt into a gel.

One of the outstanding features of the method of the instant invention is the fact that linear polyethers having high molecular weights may be formed from xylylene diol without cross-linking. The polyethers prepared according to this invention are white, opaque, hard solids which become soft at a temperature of about 5° to 10° C. below their respective melting points. The melting points of the polyethers prepared according to this invention are relatively sharp (having a range of 1° to 3° C.) and lie in the range of 125° to 134° C. Upon heating above the melting point, the polyether forms a clear, colorless, quite viscous melt from which fibres can be drawn.

The polyethers of this invention are found to be soluble in a number of solvents such as, e.g., dioxane, cyclohexanone, acetyl morpholene, benzene, benzyl alcohol and tetrahydrofurfuryl alcohol. The reduced viscosity of the fibre-forming polyether samples (0.5% solution in dioxane) was found to be at least 0.25. The average molecular weights for the various polyethers were calculated from the hydroxyl number and were found to be at least 5000 for the polyethers exhibiting fibre-forming properties.

In the practice of this invention, pure isomeric xylenes conveniently are used as starting materials for the preparation of the respective halides as well as the respective xylylene diols. In practice, for example, p-xylene is first chain-halogenated, preferably chlorinated, as will be referred to specifically hereinafter, although the terms "halogen," "halogenated" and "halides," as used throughout the specification and claims, are intended to include halogens broadly, i.e., bromine, chlorine, fluorine and iodine, chlorine being perhaps the most common and for that reason emphasized hereinafter as the preferred halogen.

For the preparation of side chain-chlorinated p-xylene, various methods may be used; for example, p-xylylene dichloride may be prepared by chlorination of p-xylene with chlorine or acid chlorides such as sulfuryl chloride in the presence of light and/or a suitable catalyst, or by chloromethylation of benzene or benzyl chloride made from toluene. Similarly, other side chain-halogenated p-xylenes, e.g., p-xylylene dibromide, may be prepared.

In order that those skilled in the art may more completely understand the present invention and the preferred methods by which the same may be carried into effect, the following specific examples are offered. In those examples wherein a polyether is formed from xylylene diol according to the condensation reaction, before heating was started, the air is replaced by pure and dry nitrogen.

EXAMPLE I

The lowest temperature at which etherification begins (i.e., evolution of water) is used as an indication of catalytic activity. In order to compare various acids and acidic substances, experiments are carried out employing 55.2 grams (0.4 mol) p-xylylene diol and 1.0 mole percent (0.004 mol) catalyst. A mixture of diol and catalyst are placed in a round bottom flask provided with a thermometer, gas inlet and outlet tube. The air in the flask is replaced with nitrogen. Table I indicates the temperature at which the beginning of etherification is observed for each of the materials tested.

Table I

| Catalyst: | Temp. (° C.) at which evolution of $H_2O$ starts |
|---|---|
| No catalyst | 307–308 |
| Terephthalic acid | 250–255 |
| Chloracetic acid | 200–205 |
| Trifluoroacetic acid | 175–180 |
| Aluminum t-butoxide | 250–255 |
| Tri-n-butyl borate | 280–285 |
| Tricresyl phosphite | 275–280 |
| Dibutyl hydrogen phosphite | 195–200 |
| Trichloracetic acid | 195–200 |
| Phenylphosphonic acid | 180–185 |
| Bis(2-ethylhexyl)2-ethylhexylphosphonate | 260–265 |
| Hydriodic acid | 120–125 |
| Heptafluoro butyric acid | 155–160 |
| Succinic acid | 220–225 |
| Tetrachloroterephthalic acid | 210–215 |
| Adipic acid | 265–270 |
| Fumaric acid | 230–235 |
| Chloromethyl phosphonic acid | 170–175 |
| Trichloromethyl phosphonic acid | 155–160 |
| Dichloromaleic anhydride | 200–205 |
| Perfluoro adipic acid | 170–175 |
| p-Toluene sulfonic acid | 125–130 |
| Sulfamic acid | 140–145 |

EXAMPLE II

In order to determine the suitability of various catalysts for the polyetherification of p-xylylene diol, experiments were conducted using the equipment, procedure and proportions of Example I. The temperature of the reaction mixture is increased to the temperature indicated in Table II and the molten reaction mixture is kept at this temperature until the evolution of water vapor becomes very slow. Then a vacuum is applied by means of an oil pump for about 30 minutes to remove the volatile products from the melt. After cooling to room temperature, the properties of the polyether are determined and these are presented in Table II.

Table II

| Catalyst | Temperature, °C. | Time, Hrs. | Polyether Melting point, ° C. | Soluble[1] | Fibre-Forming |
|---|---|---|---|---|---|
| Adipic acid | 270-300 | 8.5 | Semi-solid | Yes | No. |
| Phenylphosphonic acid | 190-210 | 7 | 131-133 | Yes | Yes. |
| Chloromethyl phosphonic acid | [3] 170-210 | 2 | 127-129 | Yes | Yes. |
| Dibutyl hydrogen phosphite | 210-215 | 2 | [2]130-135 | No | No. (gel). |
| Trifluoroacetic acid | 175-220 | 7.5 | 122-124 | Yes | No. |
| Perfluoro adipic acid | 175-200 | 8.5 | 124-126 | Yes | Yes. |
| p-Toluene sulfonic acid | [3] 125-145 | 1.25 | Not determined | No | No (gel). |
| Sulfamic acid | [3] 140-175 | 0.75 | ____do____ | No | Do. |
| Fumaric acid | 230-280 | 12 | Semi-solid | Yes | No. |
| Maleic acid | 200-220 | 7 | 92-94 | Yes | No. |
| Chloracetic acid | 225-230 | 5.5 | 72-74 | Yes | No. |
| Bis (2-ethylhexyl)2-ethylhexylphosphonate | 260-265 | 7.5 | 91-92 | Yes | No. |
| Dibutyl butyl phosphonate | 170-240 | 7.0 | 108-111 | Yes | No. |
| Tricresyl phosphite | 275-300 | 4.0 | Not determined | No | No (gel). |
| Terephthalic acid | 285-290 | 10.0 | 35-40 | Yes | No. |

[1] In dioxane at 50°-100° C.
[2] Softening range because the sample was found to be cross-linked.
[3] 0.5 mole percent.

EXAMPLE III

In order to determine the optimum reaction conditions for preparing a polyether of p-xylylene diol with phenylphosphonic acid as the catalyst, the polyetherification of p-xylylene diol is carried out as in Example II, except that in one experiment the temperature in the last phase of the condensation step is increased to 255°–260° C., and in another the condensation is continued for a longer period of time. The following table gives the properties of the polyether in relation to the temperature used in the last period of the condensation step and the extension of the condensation period beyond that normally used.

Table III

| Heating Temperature, ° C. | Extended Heating Period, Hours[1] | Melting Point, ° C. | Appearance |
|---|---|---|---|
| 235-240 | 5 | 118-119 | Yellowish, opaque solid. |
| 225-230 | 2.5 | 122-124 | Yellowish, opaque, brittle solid. |
| 255-260 | 0 | 106-108 | Yellowish, opaque, waxy solid. |
| 225-230 | 0 | 125-128 | White, opaque, hard solid [2]. |

[1] This means how much longer the heating is continued compared with Example II which is completed in 7 hours.
[2] Fibres can be drawn from this polyether.

EXAMPLE IV

Additional experiments are carried out in order to determine the effect of the amount of chloromethyl phosphonic acid on the polyetherification of p-xylyene diol. The polyetherification reaction is carried out in the same manner as in Example II, except that the amount of catalyst is changed. The following table gives the amount and properties of the polyether prepared with the standard amount (1 mole percent) and smaller amounts of chloromethyl phosphonic acid.

Table IV

| Mole Percent of Catalyst | Heating Temp., °/C. | Heating Time (Hrs.) | Polyether Amount in Grams | Polyether M.P., °/C. | Appearance |
|---|---|---|---|---|---|
| 1.0 | 200-225 | 2.0 | 44.0 | 122-125 | White, opaque, hard and brittle solid |
| 0.5 | 210-230 | 2.75 | 46.6 | 129-131 | White, opaque, brittle solid. |
| 0.25 | 210-245 | 9.0 | 45.4 | 110-112 | Light yellow, waxy solid.[2] |

[1] Fibres can be drawn from this product.
[2] Particles of gel are noticed in the melt.

The polyethers prepared by the method of the instant invention are useful for making fibres and films. They are also useful as intermediates for preparing linear, branched, or cross-linked polymers by reacting with compounds having two or more complementary groups such as, e.g., carboxyl or isocyanate groups in the molecule. These products are useful in the preparation of fibres, films, foams, adhesives, rubbers and various other materials.

Polyethers which are used for intermediates do not of necessity have to possess the high molecular weight necessary for fibre formation. These polyethers may even be mixtures of dimers, trimers, tetramers, etc. In the formation of rubbers and plastic compounds, the polyethers of m-xylylene diol are of particular interest as intermediates. This interest is due to the non-symmetrical structure of the polyethers and the fact that they are liquid at normal temperatures.

In the condensation reactions of xylylene diol employing a difunctional acid catalyst, it is believed that in many cases the catalyst, during the reaction, becomes part of the polymer. In such occurrences, the polymer formed is, in reality, a polyether-polyester mixture having mostly polyether linkages but very few polyester linkages.

It is to be understood that although the invention has been described with specific reference to particular embodiments thereof, it is not to be so limited since changes and alterations therein may be made which are within the full-intended scope of this invention as defined by the appended claims.

What is claimed is:

1. The composition of matter comprising a linear polyether having a molecular weight of at least 5,000 and containing a trace of randomly-distributed polyester linkages, obtained by condensation of xylylene diol, wherein the hydroxymethyl groups of the diol are attached to non-adjacent nuclear carbon atoms, in contact with a dibasic acid catalyst selected from the group consisting of alkyl phosphonic acid, aryl phosphonic acid, and perfluorinated dicarboxylic acid.

2. The composition of matter of claim 1 wherein the xylylene diol is p-xylylene diol.

3. The composition of matter of claim 1 wherein the acid catalyst is phenylphosphonic acid.

4. The composition of matter of claim 1 wherein the acid catalyst is perfluoro adipic acid.

5. The composition of matter of claim 1 wherein the acid catalyst is chloromethyl phosphonic acid.

6. The method of preparing a linear polyether of xylylene diol having a molecular weight of at least 5,000, said diol having the hydroxymethyl groups attached to nonadjacent nuclear carbon atoms which comprises mixing the xylylene diol and a difunctional acid catalyst selected from the group consisting of alkyl phosphonic acid, aryl phosphonic acid, and perfluorinated dicarboxylic acid, heating the mixture to a temperature of about 170° to 230° C. until water vapor evolves, maintaining the mixture at this temperature until the evolution of water vapor becomes slow, removing volatile products under vacuum, cooling and separating the polyether thus formed.

7. The method of claim 6 wherein the xylylene diol is p-xylylene diol.

8. The method of claim 6 wherein the xylylene diol is m-xylylene diol.

9. The method of claim 6 wherein the acid catalyst is chloromethyl phosphonic acid.

10. The method of claim 6 wherein the acid catalyst is phenylphosphonic acid.

11. The method of claim 6 wherein the acid catalyst is perfluoro adipic acid.

12. The method of preparing a polyether of p-xylylene diol having a molecular weight of at least 5000 which comprises mixing p-xylylene diol and between about 0.25 and 1.5, inclusive, mole percent of a dibasic acid catalyst selected from the group consisting of alkyl phosphonic acid, aryl phosphonic acid, and perfluorinated dicarboxylic acid, heating the mixture in an inert atmosphere to a temperature of about 170° to 230° C., maintaining the temperature for at least 2 hours and removing the water vapor evolved.

13. The method of claim 12 wherein the acid catalyst is chloromethyl phosphonic acid.

14. The method of claim 12 wherein the acid catalyst is phenylphosphonic acid.

15. The method of claim 12 wherein the acid catalyst is perfluoro adipic acid.

16. The method of claim 13 wherein the mixture is heated to a temperature of about 170° to 225° C. for about 2 hours.

17. The method of claim 14 wherein the mixture is heated to a temperature of about 190° to 230° C. for about 7 hours.

18. The method of claim 15 wherein the mixture is heated to a temperature of about 175° to 200° C. for about 8.5 hours.

References Cited in the file of this patent

UNITED STATES PATENTS

| | | |
|---|---|---|
| 2,716,101 | Coover et al. | Aug. 23, 1955 |
| 2,826,602 | Bortnick et al. | Mar. 11, 1958 |
| 2,877,190 | Canterino | Mar. 10, 1959 |

FOREIGN PATENTS

| | | |
|---|---|---|
| 653,489 | Great Britain | May 16, 1951 |
| 542,688 | Canada | June 25, 1957 |
| 542,689 | Canada | June 25, 1957 |